Sept. 27, 1932.    D. J. CAMPBELL    1,879,790

TIRE

Original Filed Jan. 20, 1930    2 Sheets-Sheet 1

Inventor
Donald J. Campbell
By Liverance and
Van Antwerp
Attorneys

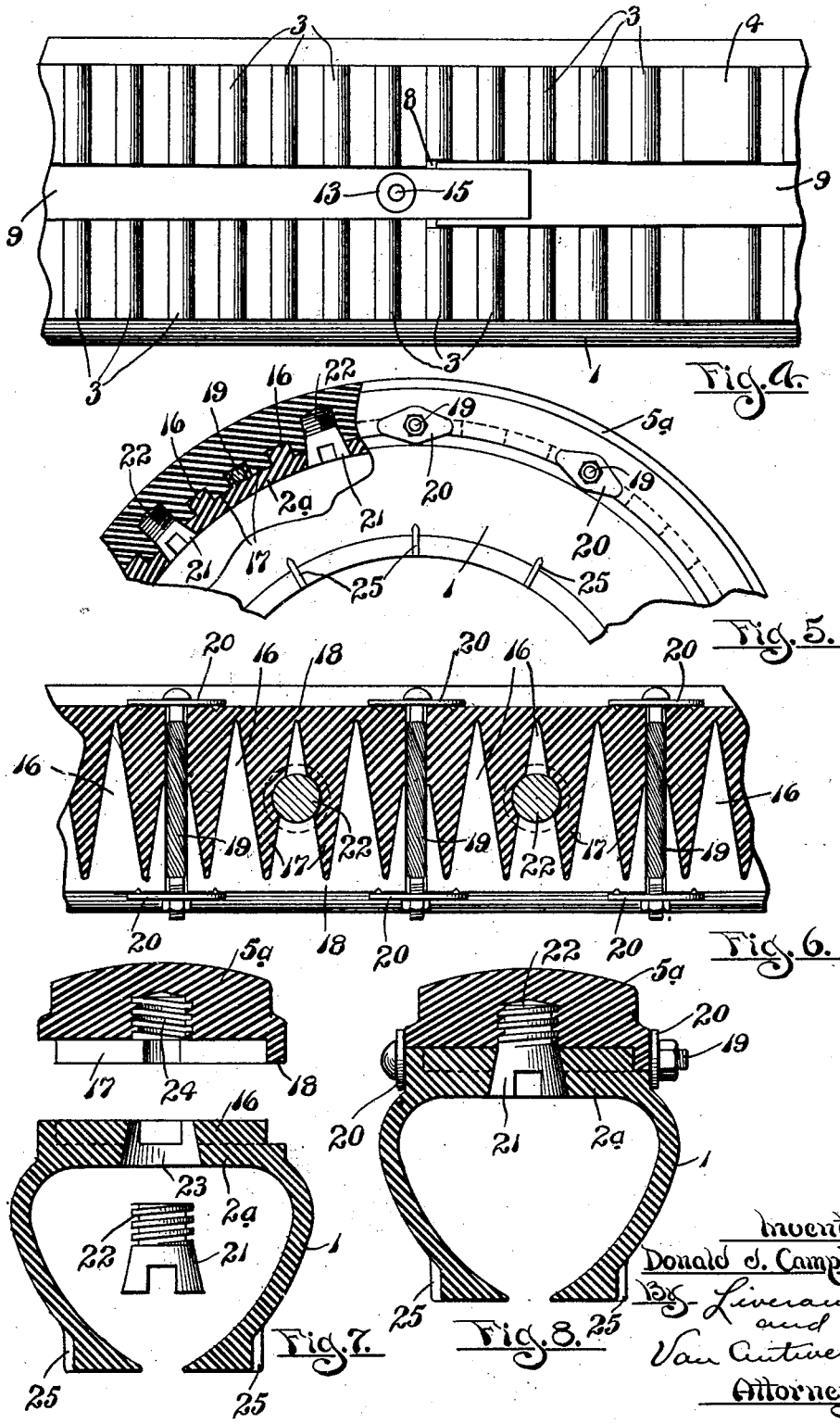

Patented Sept. 27, 1932

1,879,790

UNITED STATES PATENT OFFICE

DONALD J. CAMPBELL, OF MUSKEGON HEIGHTS, MICHIGAN

TIRE

Application filed January 20, 1930, Serial No. 421,885. Renewed January 20, 1932.

This invention relates to tires and is more concerned with detachable and replaceable treads for pneumatic tires which are used chiefly on heavy motor vehicles such as trucks or the like.

It is a primary object and purpose of the present invention to provide a detachable and replaceable tread for pneumatic tire casings, whereby when a tread becomes worn to a point where its usefulness is done it may be readily detached and removed from the casing and replaced by a new tread. In the matter of detachably securing the tread to the tire casing, it is essential that the tread when applied to the casing shall not move sidewise or laterally, that it shall not creep around the casing and that it shall not pull or move outwardly away from the tire casing; and the present invention is concerned with suitable means for preventing any such undesired movements of the tread. The means used for thus securing the tread to the casing furthermore must be such that it can be removed to free the tread and detach it from the casing; and my invention is directed to simple, practical and efficient means for securing these ends, understanding of which may be had from the following description, taken in connection with the accompanying drawing, in which, Fig. 1 is a side elevation of a tire casing equipped with my invention, certain parts being broken away and shown in section for a better disclosure of the invention.

Fig. 4 is a fragmentary plan of the tire casing and showing the locking member used therewith, the tread being removed.

Fig. 5 is a fragmentary side elevation, partly in section, illustrative of a different form of construction of the tire casing and tread and means which may be used for holding the tread against outward movement away from the casing.

Fig. 6 is a fragmentary transverse section through the tread and casing, the section being taken substantially concentric with the center of the tire.

Fig. 7 is a fragmentary cross section through the tire casing and tread as shown in Fig. 5 with the parts separated, and Fig. 8 is a similar section showing the parts secured together.

Like reference characters refer to like parts in the different figures of the drawing.

Figure 1:
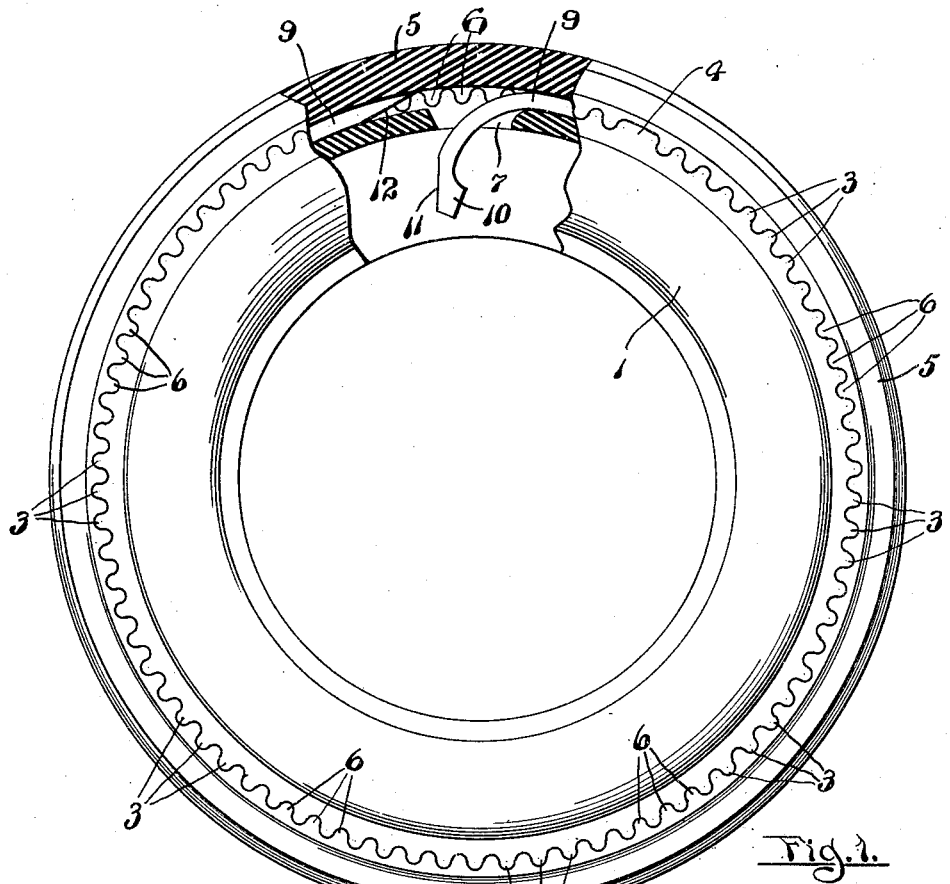

The casing 1 of the tire has an outer flat side 2 on which, as shown in Figs. 1 and 4, a plurality of spaced apart transverse ribs 3 are made similar to the teeth of a gear and at one point, as indicated at 4, a wider rib is provided, the purpose of which will later be explained.

The tread 5 of rubber at its inner side is provided with a consecutive plurality of spaced apart cross ribs 6 which are adapted to fit in the spaces between the ribs 3 on the tire casing. The inner side of the tread is also formed at one point with a wider space to receive the wider rib 4 on the casing whereby the tread can be applied to the casing only in one position, that in which the rib 4 will enter the recess provided for it on the inner side of the tread.

An opening 7 is made through the outer wall 2 of the tire casing. A continuous annular groove is made around the outer side of the casing 1 and the inner side of the tread 5 indicated at 8 substantially midway between the ends of the ribs 3 and 6. This groove gradually tapers from one end to the other and in the same a continuous locking key 9 is adapted to be located after the tread has been positioned over the casing in proper relation thereto. The key or locking member 9, which may be of rubber of somewhat harder consistency than the rubber of the tread, is tapered to correspond with the groove 8 in which it is received, the narrower end being inserted into the wider end of the groove through the opening 7 and the key forced around through the groove which it will follow readily by reason of the tapered character of the groove and of the key or locking member, until the outer end of the key at 10 enters the opening 7. The opposite ends of the key or locking member are cut on inclines, indicated at 11 and 12, whereby when the key is finally in place the two inclines 11 and 12 come together as shown in Fig. 3 and the groove at 8 is completely filled.

Figures 2, 3:
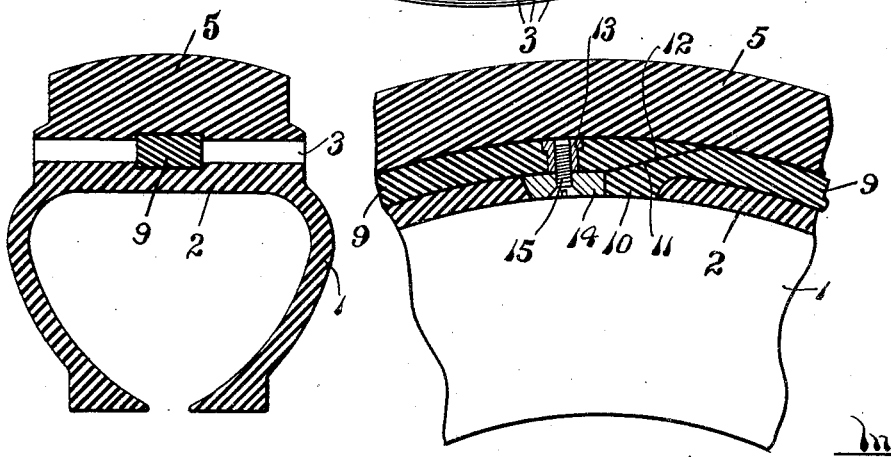
Fig. 2 is a transverse section through the casing.
Fig. 3 is a fragmentary longitudinal section through the tire casing and tread at the point where the tread locking means has its ends coming together.

After the key or locking member has been thus inserted in place the end portion 10 partly fills the opening 7 as shown in Fig. 3. A threaded sleeve 13 is disposed in the opposite end portion of the key through it so as to come directly above the remainder of the opening 7 which is not filled by the end 10. A filler block 14 is used to fill the remainder of the opening 7 through which a screw 15 passes to screw into the sleeve 13 thereby locking the key in place and providing a smooth unbroken surface at the inner side of the tire casing.

With the locking key 9 in place the tread is held against sidewise movement with respect to the casing on which it is placed while the engagement of the ribs 3 and 6 precludes any creeping of the tread around the casing. When a tread has become worn and is to be replaced it is necessary only to remove the screw 15 and filler block 14, whereupon the locking key 9 may be readily withdrawn, freeing the tread for sidewise movement which will disengage it from the casing. In practice any suitable material such as powered soap stone or the like may be used between the casing and tread and dusted into the groove 8 so that vulcanization of the parts or sticking together will not occur.

In Figs. 5 to 8, inclusive, a different form of construction is shown. The casing 1 has a flat outer side 2a on the outer side of which a plurality of projections 16 are made connected together at one end and tapering to points at their opposite ends. The tread 5a has cooperating inwardly extending projections 17 of similar form but reversed as to position whereby the projections 17 may fit between the projections 16 on the casing. The outer wider ends of the projections 16 and 17 are continuous as indicated at 18 providing a substantially continuous rib as shown. A plurality of bolts 19, which in practice are made from lengths of flexible twisted wire having welded ends, one formed with a head and the other screw threaded to receive a nut, may be used to extend transversely across and between the outer side of the tire casing and the inner side of the tread, metal plates 20 bearing against the sides of the casing and tread and overlapping the joints between them, the bolts passing through said plates.

The tread and casing may be also secured together by means of tapering plugs 21 having screw threaded projections 22 which extend into and pass through tapered recesses 23 in the outer side of the casing adapted to fit the tapered plugs 21 while the threaded projections 22 screw into the threaded sockets 24 in the inner side of the tread thereby locking the tread against movement with respect to the casing either laterally in an outward direction or in a direction around the tire.

The constructions described are particularly available for use with heavy duty tires wherein the treads wear more rapidly than the remainder of the tire deteriorates so that it is desirable that the tread may be replaced by a new one to obtain the full service value of the tire casing. The beads of the casing may be provided with spaced apart outwardly extending radial ribs 25 to engage in suitable recesses in a wheel rim to hold the entire tire against creeping. The invention is defined in the appended claims and is to be considered comprehensive of all forms of structure coming within their scope.

I claim:

1. A tire construction comprising a tire casing, a separable continuous tread around the casing, interengaging means on the adjacent sides of the tire and casing for holding the tread against creeping movement, and a continuous locking key adapted to be inserted from inside the casing through the same and between the casing and tread for holding the tread against lateral movement with respect to the casing.

2. A tire construction comprising, a tire casing, a separable continuous tread adapted to be detachably applied to and around the casing, said tread and casing at adjacent sides having complementary grooves thereby forming a continuous opening around and between the same, a locking key received in the opening between the casing and tread after the tread has been applied in place, said casing at one point at its inner side having a passage to said continuous opening for the inserton or removal of the locking key.

3. A construction containing the elements in combination defined in claim 2, the end portions of said locking key being adapted to overlap thereby making a continuous locking member filling said continuous opening, a part of the passage in the casing to said opening being filled by one end portion of said locking key, a locking block filling the remainder of said passage, and means for detachably securing said locking block to the other end portion of the key.

4. A construction containing the elements in combination defined in claim 2, said continuous opening around the tire between the casing and tread being continuously tapered and progressively reduced in size, and said locking key being of like and complementary form whereby its smaller end may be introduced into larger end of the opening and readily inserted therethrough and thereby completely fill the passage when wholly introduced thereinto.

5. A tire construction comprising a tire casing, a separable tread adapted to be detachably applied to and around the casing, said tread and casing at adjacent sides having complementary grooves thereby forming a continuous opening around and between the same, a locking key received in the opening between the casing and tread after the tread has been applied in place, said casing at one point at its inner side having a passage to said continuous opening for the insertion or removal of the locking key, and means for holding said locking key in position.

6. A tire construction comprising a tire casing, a separable tread around the casing, means on the adjacent sides of the tire and casing for holding the tread against creeping movement, and a continuous locking key adapted to be inserted from inside the casing through the same and between the casing and tread for holding the tread against lateral movement with respect to the casing.

7. A tire construction comprising a tire casing, a separable tread around the casing, and a continuous locking key adapted to be inserted from inside the casing through the same and between the casing and tread for holding the tread against lateral movement with respect to the casing.

8. A tire construction comprising a tire casing, a separable tread around the casing, a separable continuous locking key adapted to be inserted between the casing and tread for holding the tread against lateral movement with respect to the casing, and means on the key to prevent any circumferential movement thereof.

9. A tire construction comprising a tire casing having a continuous annular groove therearound and a passage leading into the casing, a separable tread around the casing, a continuous locking key adapted to be inserted in said annular groove between the casing and tread for holding the tread against lateral movement with respect to the casing, the end portions of said locking key being adapted to overlap thereby making a continuous locking member filling said continuous annular groove, a part of the passage in the casing to said opening being filled by one end portion of said locking key, a locking block filling the remainder of said passage, and means for detachably securing said locking block to the other end portion of the key.

10. A tire construction comprising a tire casing having a continuous groove therearound, a tread around the casing, a locking key adapted to be inserted in said groove between the casing and tread, said continuous groove around the tire between the casing and tread being continuously tapered and progressively reduced in size, and said locking key being of like and complementary form whereby its smaller end may be introduced into larger end of the opening and readily inserted therethrough and thereby completely fill the passage when wholly introduced thereinto.

11. In combination, a tire casing having a circumferential groove around its outer face, a separable tread around the casing, said casing having an opening therethrough, and key means insertible through said opening and extending circumferentially in said groove to lock the tread onto the casing.

In testimony whereof I affix my signature.
DONALD J. CAMPBELL.